(12) United States Patent
Durbin et al.

(10) Patent No.: US 11,356,167 B1
(45) Date of Patent: Jun. 7, 2022

(54) SELECTIVE CALIBRATION OF SIGNAL PROCESSING INTEGRATED CIRCUITS IN A PHASED ARRAY SYSTEM

(71) Applicant: Anokiwave, Inc., San Diego, CA (US)

(72) Inventors: Jason Leo Durbin, San Diego, CA (US); Andrew Michael Street, Groton, MA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

(21) Appl. No.: 17/230,531

(22) Filed: Apr. 14, 2021

Related U.S. Application Data (60) Provisional application No. 63/009,759, filed on Apr. 14, 2020.

(51) Int. Cl.
*H04B 7/08* (2006.01)
*H04B 7/06* (2006.01)
*H04B 17/21* (2015.01)

(52) U.S. Cl.
CPC ........... *H04B 7/086* (2013.01); *H04B 7/0639* (2013.01); *H04B 17/21* (2015.01)

(58) Field of Classification Search
CPC ....... H04B 7/086; H04B 17/21; H04B 7/0639
See application file for complete search history.

(56) References Cited

U.S. PATENT DOCUMENTS

| | | |
|---|---|---|
| 6,194,962 B1 | 2/2001 | Chen |
| 7,126,510 B2 | 10/2006 | Mon et al. |
| 7,130,701 B1* | 10/2006 | Wischinski .......... G05B 19/042 |
| | | 700/65 |
| 7,826,417 B2 | 11/2010 | Yang et al. |
| 8,120,532 B2 | 2/2012 | Rofougaran et al. |
| 9,214,950 B1 | 12/2015 | Davis et al. |
| 9,495,285 B2 | 11/2016 | Hsu et al. |
| 9,520,836 B1 | 12/2016 | Kaper |
| 9,876,514 B1 | 1/2018 | Corman et al. |
| 10,033,331 B1 | 7/2018 | Ivanov et al. |
| 10,263,650 B2 | 4/2019 | Corman et al. |

(Continued)

OTHER PUBLICATIONS

Fussell, Don, Chapter 2, "Bits, Data Types and Operations", University of Texas at Austin CS310H—Computer Organization, (Year: 2010), 56 pages.

*Primary Examiner* — Jaison Joseph
(74) *Attorney, Agent, or Firm* — Nutter McClennen & Fish LLP (57) ABSTRACT

A selective calibration system for signal processing integrated circuits includes a calibration information generator that receives information identifying a group of signal processing integrated circuits associated with a product, the group of signal processing integrated circuits being a subset of a population of signal processing integrated circuits for which performance information is stored, and uses the performance information to produce calibration information for the identified signal processing integrated circuits as a group. The calibration information generator generally uses only performance information associated with the identified signal processing integrated circuits to produce the calibration information so that each signal processing integrated circuit in the group is calibrated relative to just that group of signal processing integrated circuits. Direct product access to the calibration information generator can be provided.

21 Claims, 7 Drawing Sheets

(56) References Cited

U.S. PATENT DOCUMENTS

| | | |
|---|---|---|
| 10,608,756 B2 | 3/2020 | Jain et al. |
| 10,855,383 B2 | 12/2020 | McMorrow et al. |
| 2003/0128594 A1 | 7/2003 | Tran et al. |
| 2005/0132241 A1 | 6/2005 | Curt et al. |
| 2006/0256880 A1 | 11/2006 | Frisch |
| 2009/0279594 A1 | 11/2009 | Muhammad |
| 2009/0298440 A1 | 12/2009 | Takeya et al. |
| 2010/0156536 A1 | 6/2010 | Lee et al. |
| 2014/0111373 A1 | 4/2014 | Puzella et al. |
| 2015/0048242 A1 | 2/2015 | Remillard et al. |
| 2017/0070199 A1 | 3/2017 | Anderson et al. |
| 2017/0193362 A1* | 7/2017 | Cremer ................. G06N 3/04 |
| 2018/0084105 A1 | 3/2018 | Hiscock et al. |
| 2018/0137072 A1* | 5/2018 | Chen ................. G06F 13/4282 |
| 2019/0074806 A1 | 3/2019 | Scott et al. |
| 2019/0180237 A1* | 6/2019 | Mattingly ........ G06Q 10/08355 |
| 2019/0206467 A1 | 7/2019 | Karmakar et al. |

\* cited by examiner

SELECTIVE CALIBRATION OF SIGNAL PROCESSING INTEGRATED CIRCUITS IN A PHASED ARRAY SYSTEM

CROSS-REFERENCE TO RELATED APPLICATION(S)

This patent application claims the benefit of United States Provisional Patent Application No. 63/009,759 entitled SELECTIVE CALIBRATION OF SIGNAL PROCESSING INTEGRATED CIRCUITS IN A PHASED ARRAY SYSTEM filed Apr. 14, 2020, which is hereby incorporated herein by reference in its entirety.

FIELD OF THE INVENTION

Illustrative embodiments of the invention relate to phased array systems, and, more particularly, the illustrative embodiments of the invention relate to calibration of signal processing integrated circuits (ICs) in phased array systems.

BACKGROUND OF THE INVENTION

Signal processing integrated circuits (ICs) used in phased array systems such as 5G communication systems generally need to be configured with calibration information such as for configuring phase and amplitude performance. Generally speaking, a signal processing IC may be calibrated by the manufacturer prior to selling the signal processing IC to a customer. For example, the manufacturer may maintain a database of performance information for a large population of signal processing ICs that have been produced and tested and then use this database of performance information to produce calibration information for a particular signal processing IC. In this way, each signal processing IC is essentially calibrated relative to the entire population of signal processing ICs based on the distribution of performance information across all signal processing ICs.

SUMMARY OF VARIOUS EMBODIMENTS

In accordance with one embodiment of the invention, a phased array device comprises a plurality of signal processing integrated circuits; at least one processor; and at least one memory including program code which when executed by the at least one processor provides a controller configured to at least read device identifiers for the installed signal processing integrated circuits; provide, via a communication system, the device identifiers to a calibration information generator; receive, via the communication system, calibration information from the calibration information generator; and configure, based on the calibration information received form the calibration information generator, the group of installed signal processing integrated circuits using the calibration information.

In various alternative embodiments, the calibration information may be obtained for the installed signal processing integrated circuits once for an initial configuration of the installed signal processing integrated circuits. Alternatively, the calibration information may be obtained for the installed signal processing integrated circuits at multiple times including at least one of each time the product is powered on; each time the product restarts; each time the product reboots; each time the product is reconfigured; or each time the product is updated. The communication system may include wireless Internet access.

In accordance with another embodiment of the invention, a selective calibration system for signal processing integrated circuits comprises a calibration information generator that receives information identifying a group of signal processing integrated circuits associated with a product, the group of signal processing integrated circuits being a subset of a population of signal processing integrated circuits for which performance information is stored, and uses the performance information to produce calibration information for the identified signal processing integrated circuits as a group.

In various alternative embodiments, the calibration information generator may use only performance information associated with the identified signal processing integrated circuits to produce the calibration information so that each signal processing integrated circuit in the group is calibrated relative to just that group of signal processing integrated circuits. The selective calibration system may include an operator interface through which an operator provides the information identifying the group of signal processing integrated circuits to the calibration information generator and obtains the calibration information for the identified group of signal processing integrated circuits from the calibration information generator. The selective calibration system may include a customer interface through which a customer provides the information identifying the group of signal processing integrated circuits directly to the calibration information generator, which generates the calibration information for the identified group of signal processing integrated circuits and returns the calibration information to the customer via the customer interface for programming the product. The selective calibration system includes a product interface through which the product provides the information identifying the group of signal processing integrated circuits directly to the calibration information generator, which generates the calibration information for the identified group of signal processing integrated circuits and returns the calibration information to the product via the product interface for programming the group of signal processing integrated circuits. The product interface may include wireless Internet access. The calibration information may be obtained for the product once for an initial product configuration or may be obtained for the product at multiple times including at least one of each time the product is powered on; each time the product restarts; each time the product reboots; each time the product is reconfigured; or each time the product is updated. The system may further include a performance information database containing the performance information for the population of signal processing integrated circuits, wherein the calibration information generator uses the performance information from the performance information database to produce the calibration information for the identified signal processing integrated circuits as a group.

In accordance with yet another embodiment of the invention, a selective calibration method comprises receiving, by a calibration information generator, information identifying a group of signal processing integrated circuits associated with a product, the group of signal processing integrated circuits being a subset of a population of signal processing integrated circuits for which performance information is stored; and using the stored performance information to produce calibration information for the identified signal processing integrated circuits as a group.

In various alternative embodiments, the calibration information generator may use only performance information associated with the identified signal processing integrated circuits to produce the calibration information so that each signal processing integrated circuit in the group is calibrated relative to just that group of signal processing integrated circuits. The selective calibration system may include an operator interface through which an operator provides the information identifying the group of signal processing integrated circuits to the calibration information generator and obtains the calibration information for the identified group of signal processing integrated circuits from the calibration information generator. The selective calibration system may include a customer interface through which a customer provides the information identifying the group of signal processing integrated circuits directly to the calibration information generator, which generates the calibration information for the identified group of signal processing integrated circuits and returns the calibration information to the customer via the customer interface for programming the product. The selective calibration system includes a product interface through which the product provides the information identifying the group of signal processing integrated circuits directly to the calibration information generator, which generates the calibration information for the identified group of signal processing integrated circuits and returns the calibration information to the product via the product interface for programming the group of signal processing integrated circuits. The product interface may include wireless Internet access. The calibration information may be obtained for the product once for an initial product configuration or may be obtained for the product at multiple times including at least one of each time the product is powered on; each time the product restarts; each time the product reboots; each time the product is reconfigured; or each time the product is updated. The system may further include a performance information database containing the performance information for the population of signal processing integrated circuits, wherein the calibration information generator uses the performance information from the performance information database to produce the calibration information for the identified signal processing integrated circuits as a group.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

In exemplary embodiments, a group of signal processing ICs being used in a particular phased array product are identified, and calibration information is generated for those signal processing ICs for operating together as a group. Preferably, the calibration information generated for those signal processing ICs is based on the performance information associated with just the signal processing ICs in the product so that each signal processing IC in the group is effectively calibrated relative to a subset of signal processing ICs as opposed to being calibrated individually relative to the entire population of signal processing ICs (many of which would not be in the product). Such a focused calibration method can produce better calibration information, allowing the group of signal processing ICs to operate more optimally together in the product.

Figure 1:
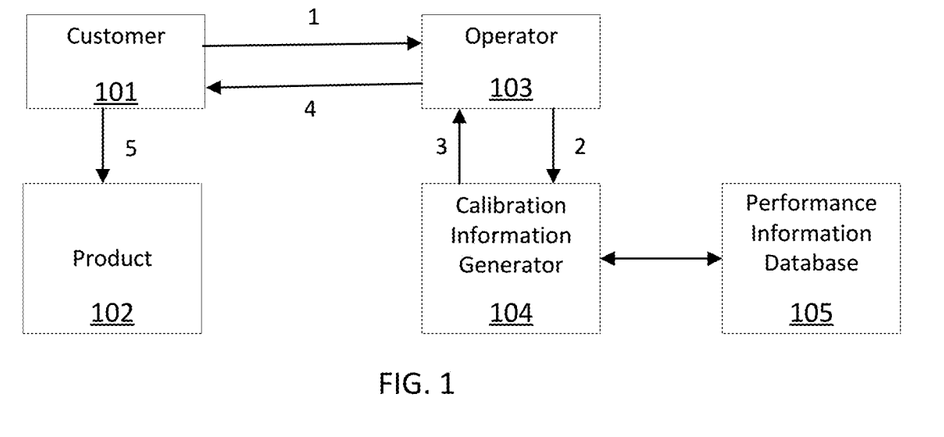
FIG. 1 is a schematic diagram showing components and process flow for selective calibration of a group of signal processing ICs, in accordance with a first exemplary embodiment.

FIG. 1 is a schematic diagram showing components and process flow for selective calibration of a group of signal processing ICs, in accordance with a first exemplary embodiment. Here, the manufacturer would ship signal processing ICs to a customer 101. The customer 101 would install some of those signal processing ICs in a particular product 102, generally in a non-specific manner (e.g., if the product 102 requires N signal processing ICs, then the customer 101 installs any N of the signal processing ICs into the product 102). In process flow 1, the customer 101 would then provide device identification information (e.g., device serial numbers) for the installed signal processing ICs to the manufacturer 103, e.g., via email or other prescribed mechanism. The manufacturer 103 sends the device identification information to a calibration information generator 104 (process flow 2) that produces calibration information for each of those specific devices using performance information from the performance information database 105 (process flow 3). The manufacturer 103 would then provide the calibration information to the customer 101, e.g., via email or other prescribed mechanism (process flow 4). The customer 101 then would program the product 102 based on the calibration information (process flow 5).

Figure 2:
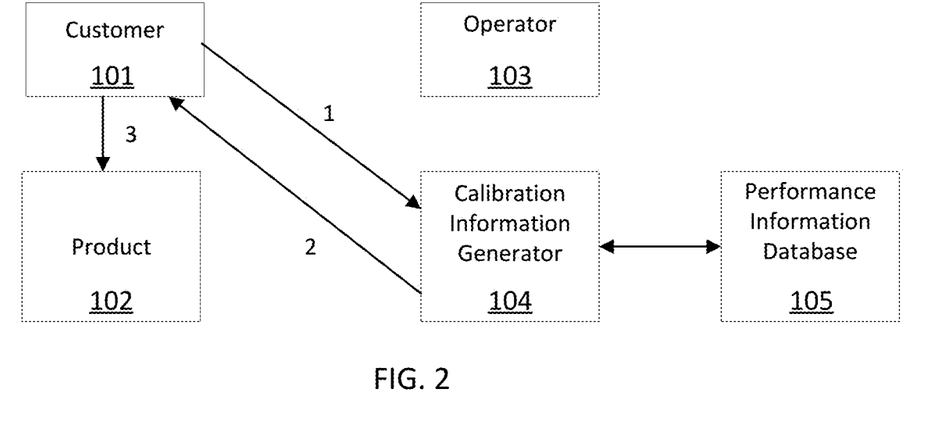
FIG. 2 is a schematic diagram showing components and process flow for selective calibration of a group of signal processing ICs, in accordance with a second exemplary embodiment.

FIG. 2 is a schematic diagram showing components and process flow for selective calibration of a group of signal processing ICs, in accordance with a second exemplary embodiment. Here, the manufacturer would provide direct customer access to the calibration information generator, e.g., using Internet access or other prescribed mechanism. Therefore, rather than providing device identification information (e.g., device serial numbers) for the installed signal processing ICs to the manufacturer as in FIG. 1, the customer 101 would provide the device identification information directly to the calibration information generator 104 (process flow 1), which produces calibration information for each of those specific devices using performance information from the performance information database 105 and provides the calibration information to the customer 101 (process flow 2). The customer 101 then would program the product 102 based on the calibration information (process flow 3).

Figure 3:
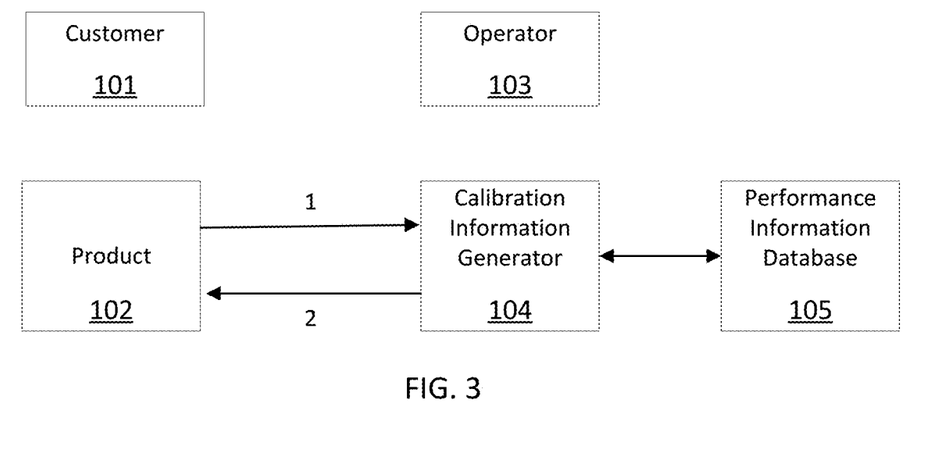
FIG. 3 is a schematic diagram showing components and process flow for selective calibration of a group of signal processing ICs, in accordance with a third exemplary embodiment.

FIG. 3 is a schematic diagram showing components and process flow for selective calibration of a group of signal processing ICs, in accordance with a third exemplary embodiment. Here, the manufacturer would provide direct product access to the calibration information generator 104, e.g., using wireless Internet access or other prescribed mechanism. Now, when the product 102 is powered on or at any other designated time(s), the controller in the product 102 would read the device identification information (e.g., device serial numbers) for the installed signal processing ICs and provide the device identification information directly to the calibration information generator 104 (process flow 1), which produces calibration information for each of those specific devices using performance information from the performance information database 105 and provides the calibration information to the product 102 (process flow 2). The product 102 then would program the installed signal processing ICs based on the calibration information.

Figure 10:
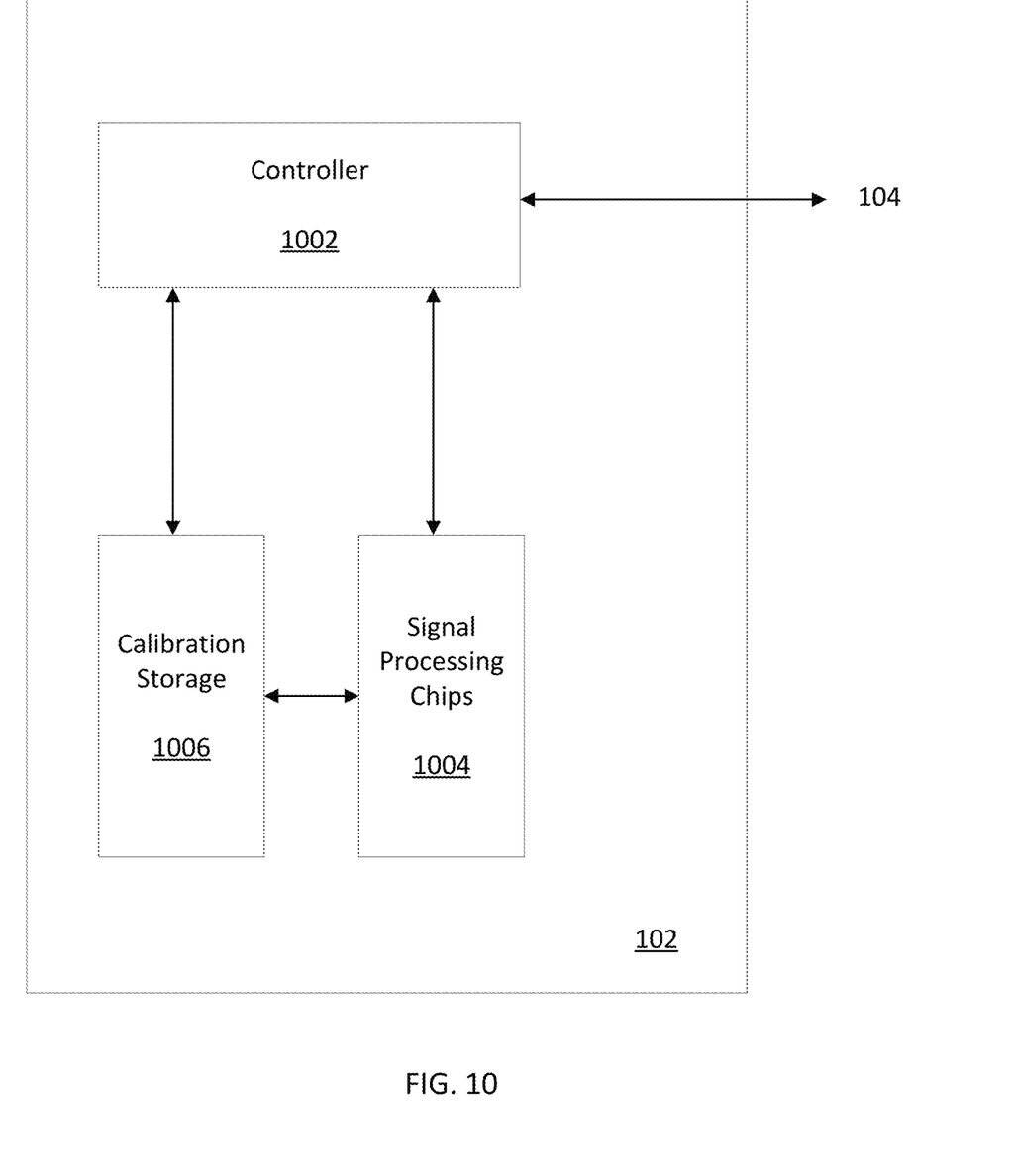
FIG. 10 is a schematic diagram showing relevant components of a phased array device, in accordance with certain exemplary embodiments.

FIG. 10 is a schematic diagram showing relevant components of a phased array device 102 in accordance with FIG. 3, in accordance with certain exemplary embodiments. Among other things, this phased array device 102 includes a controller 1002, various signal processing chips 1004, and calibration information storage 1006. As discussed above, the controller 1002 may be configured to read the device identification information (e.g., device serial numbers) for the installed signal processing ICs 1004 and provide the device identification information directly to the calibration information generator 104 (process flow 1), which produces calibration information for each of those specific devices using performance information from the performance information database 105 and provides the calibration information to the controller 1002 (process flow 2). The controller 1002 programs or otherwise configures the installed signal processing ICs 1004 based on the calibration information, e.g., by storing the calibration information in the calibration information storage 1006, which can include, for example, calibration registers or other storage in or accessed by the signal processing ICs 1004. Generally, the controller 1002 includes at least one processor and at least one memory including program code which when executed by the at least one processor provides the controller.

In the above examples, the calibration information storage 105 may include a database of performance information for a large population of signal processing ICs that have been produced and tested. The calibration information generator 104 can use this database of performance information to produce calibration information for the specific signal processing ICs in the product 102. For example, calibration information typically includes gain/attenuation and phase information at different frequency points from production testing from which phase calibration parameters to bring all devices as close to phase synchronization as possible and gain/attenuation parameters to bring all devices as close to gain synchronization as possible (e.g., Atten_N=Gain_N−min(gain_of_all_devices), where Atten_N is the attenuation for signal processing IC N and Gain_N is the nominal gain for signal processing IC N) can be computed for each signal processing IC.

These focused calibration techniques can be applied to various types of phased array systems and products. In certain exemplary embodiments, the focused calibration techniques can be applied in the context of active electronically steered antenna (AESA) systems also called Active Antenna, although the present invention is in no way limited to AESA systems. AESA systems form electronically steerable beams that can be used for a wide variety of applications. Although certain details of various embodiments of an AESA system are discussed below, those skilled in the art can apply some embodiments to other AESA systems. Accordingly, discussion of an AESA system does not necessarily limit certain other embodiments.

Figure 4:
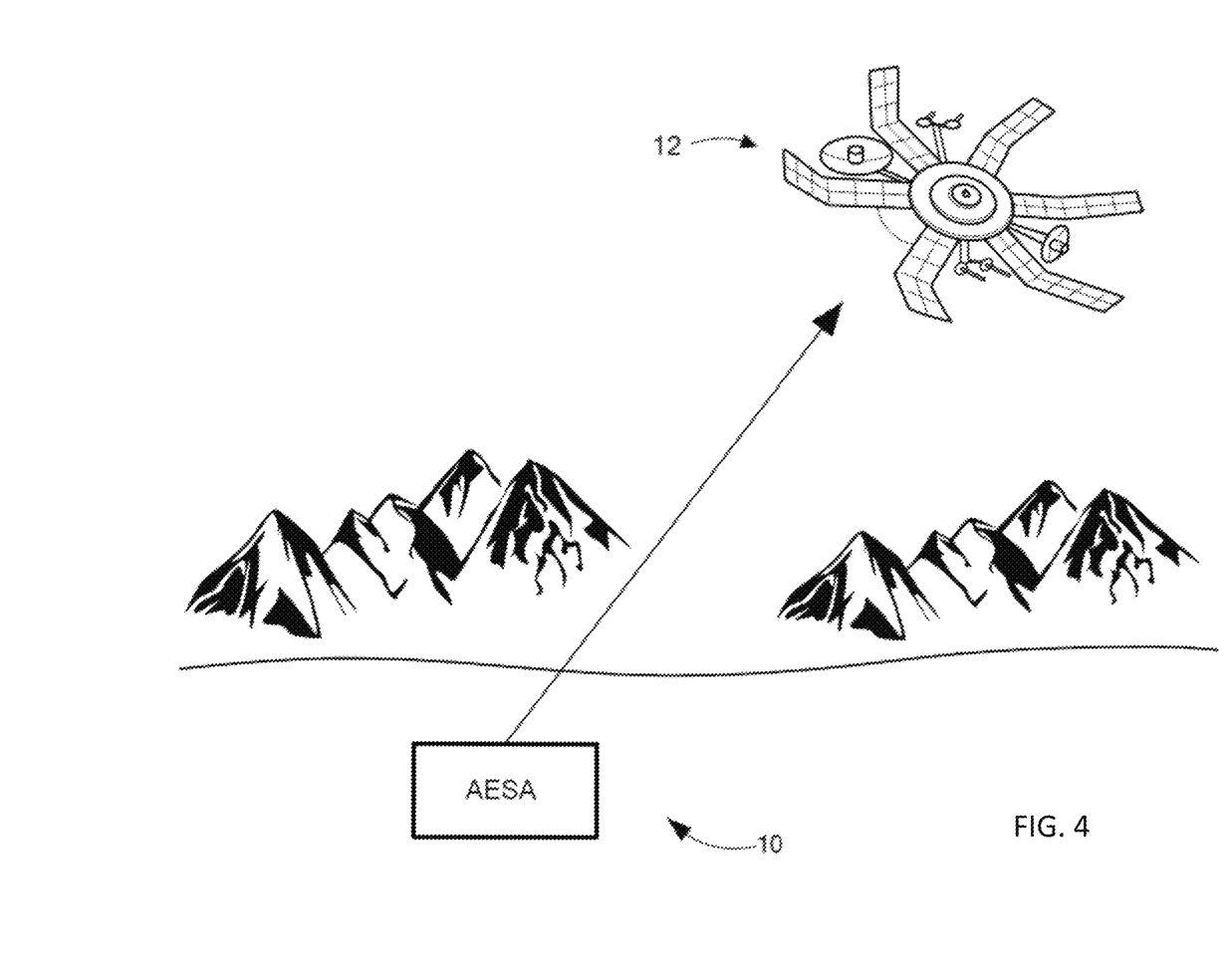
FIG. 4 schematically shows an active electronically steered antenna system ("AESA system") configured in accordance with certain illustrative embodiments of the invention and communicating with an orbiting satellite.

FIG. 4 schematically shows an active electronically steered antenna system ("AESA system 10") configured in accordance with certain illustrative embodiments of the invention and communicating with an orbiting satellite 12. A phased array implements the primary functionality of the AESA system 10. Specifically, as known by those skilled in the art, the phased array forms one or more of a plurality of electronically steerable beams that can be used for a wide variety of applications. As a satellite communication system, for example, the AESA system 10, may be configured to operate at one or more satellite frequencies. Among others, those frequencies may include the Ka-band, Ku-band, and/or X-band. Of course, as satellite communication technology progresses, future implementations may modify the frequency bands to communicate using new satellite frequencies.

Figure 5:
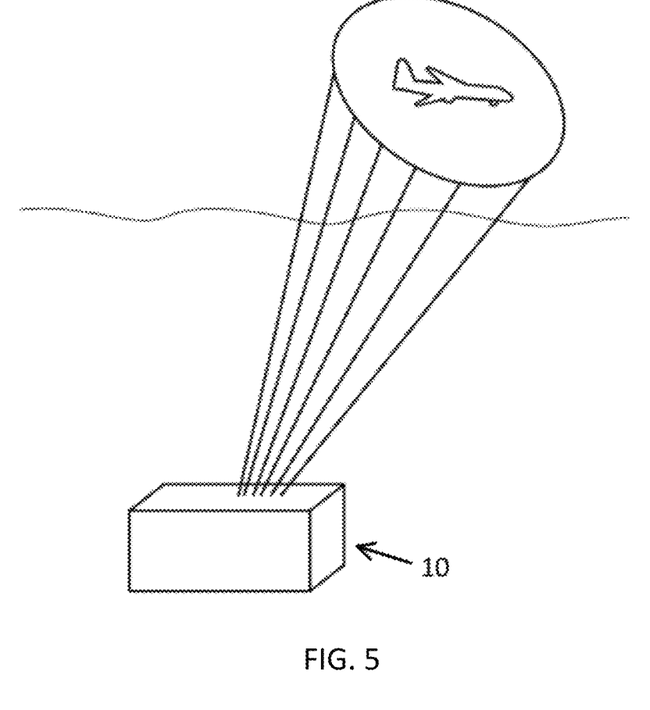
FIG. 5 schematically shows an AESA system configured in accordance with certain illustrative embodiments of the invention and implemented as a radar system in which a beam-formed signal may be directed toward an aircraft or other object in the sky (e.g., to detect or track position of the object).

FIG. 5 schematically shows an AESA system 10 configured in accordance with certain illustrative embodiments of the invention and implemented as a radar system in which a beam-formed signal may be directed toward an aircraft or other object in the sky (e.g., to detect or track position of the object).

Figure 6:
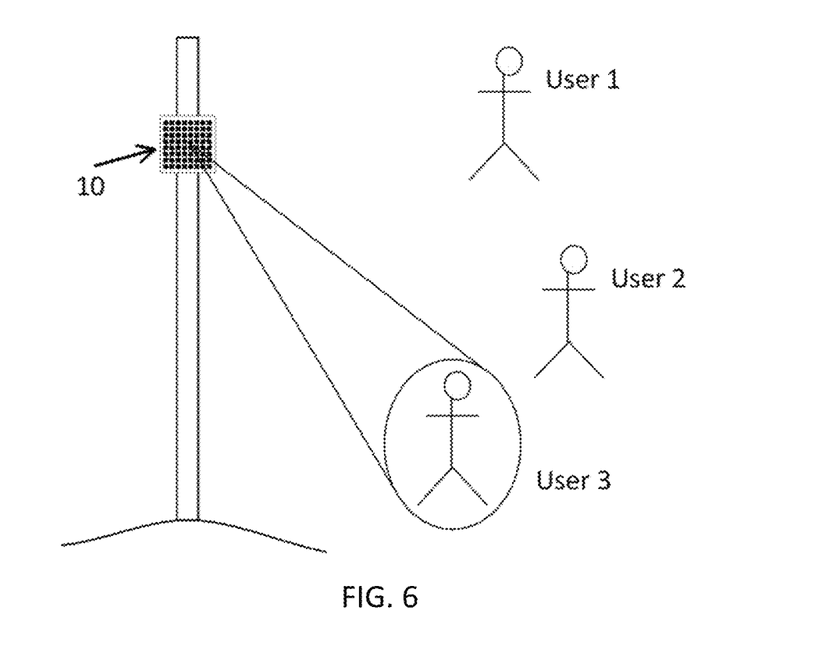
FIG. 6 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells).

FIG. 6 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells). Of course, other implementations may include other types of wireless communication systems.

Of course, those skilled in the art use AESA systems 10 and other phased array systems in a wide variety of other applications, such as RF communication, optics, sonar, ultrasound, etc. Accordingly, discussion of satellite, radar, and wireless communication systems are not intended to limit all embodiments of the invention.

The satellite communication system may be part of a cellular network operating under a known cellular protocol, such as the 3G, 4G (e.g., LTE), or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

In exemplary embodiments, a phased array includes various signal processing integrated circuits including a quantity X of beam forming integrated circuits (BFICs), with each BFIC supporting a quantity Y of beam forming elements (e.g., 2 or 4 beam forming elements per BFIC, although not limited to 2 or 4). Thus, such a phased array includes (X*Y) beam forming elements. In certain exemplary embodiments, the beam forming elements may be implemented as patch antennas that are formed on one side of a laminar printed circuit board, although it should be noted that the present invention is not limited to patch antennas or to a laminar printed circuit board.

In certain exemplary embodiments, signals to/from a number of BFIC chips are aggregated by a conditioning integrated circuit (CDIC) chip or an interface integrated circuit (IFIC) chip, and signals to/from a number of CDIC chips (if included) can be aggregated by an interface integrated circuit (IFIC) chip. The BFIC chips, CDIC chips, and/or IFIC chips can be used to create different sized sub-arrays (e.g., a sub-array having 64 beam forming elements or a sub-array having 256 beam forming elements), and in some embodiments multiple sub-arrays are used to form larger arrays. Thus, one exemplary embodiment includes a chipset including a BFIC chips, CDIC chips, and/or IFIC chips that can be used in various combinations in order to produce various array and sub-array configurations. In exemplary embodiments, the three types of chips (such as, for example, CDIC, BFIC and/or IFIC chips) can be combined in a modular fashion and in combination they can create arbitrary arrays of any form factor and size. In certain exemplary embodiments, the IFIC chips perform frequency translation, while the CDIC chips perform signal conditioning and distribution. In typical situations, there are many antenna elements and thus many BFICs, but only a small number of CDIC and/or IFIC chips. The ability to form arbitrary arrays can be very useful for phased arrays such as phased arrays used in 5G cellular systems. Such phased arrays may be included in base stations, consumer premise equipment, user equipment (such cell phones), end nodes (such as Internet of Things of IoT devices), and the like.

In certain exemplary embodiments, each BFIC chip supports a number of beam forming elements (e.g., four beam forming elements per BFIC chip in one exemplary embodiment, although other configurations are possible), and signals to/from groups of BFIC chips are aggregated through a network of interconnected CDIC chips to a single IFIC chip. In some exemplary embodiments, the CDIC chips have two signal channels, while in other exemplary embodiments, the CDIC chips have other numbers of signal channels (e.g., four signal channels). In certain exemplary embodiments, the IFIC is essentially a single-channel device through which beam forming signals for a given sub-array are transmitted and received.

Figure 7:
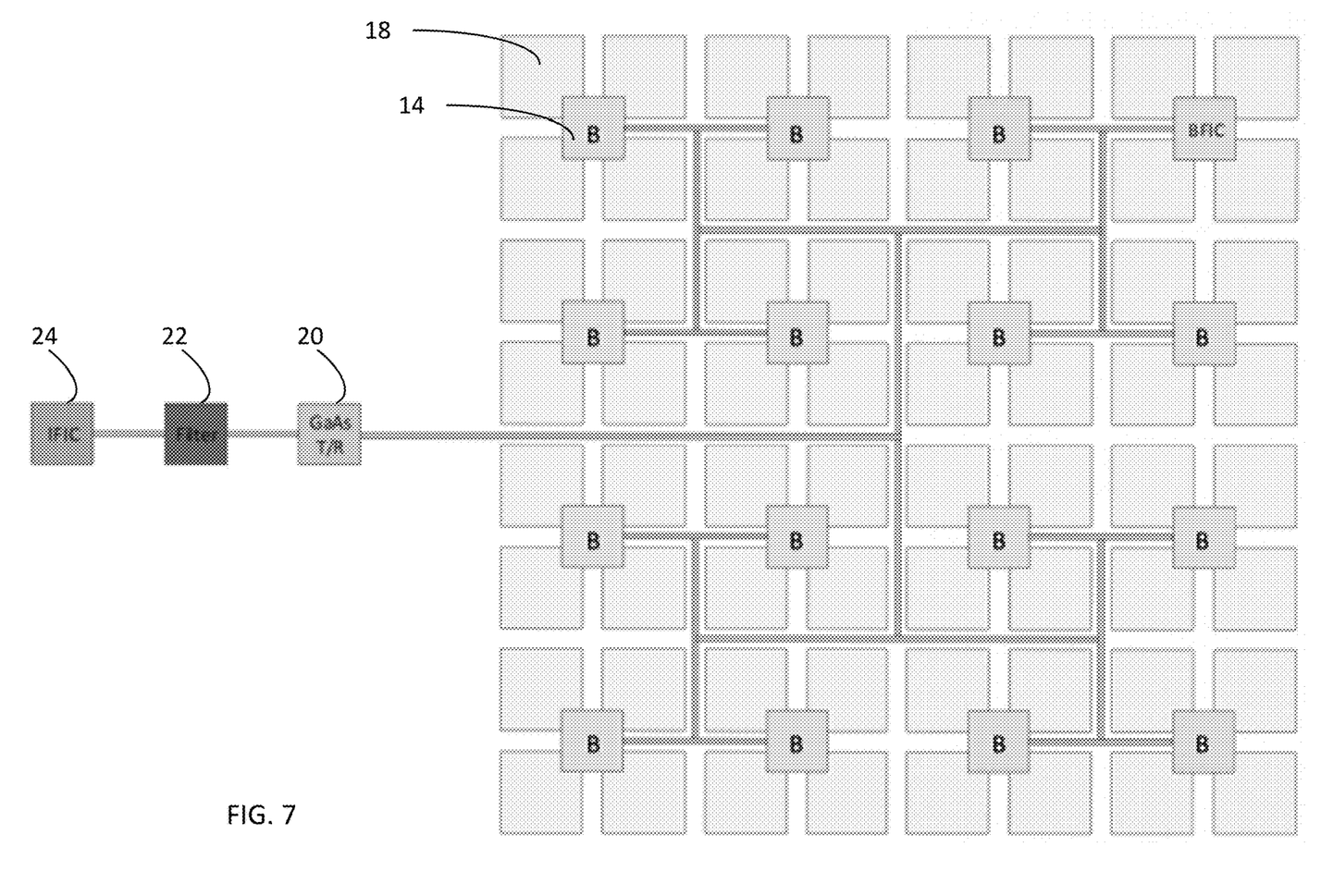
FIG. 7 is a schematic diagram showing various components of a phased array, in accordance with one exemplary embodiment.

FIG. 7 is a schematic diagram showing various components of phased array, in accordance with one exemplary embodiment. Here, each BFIC chip 14 (the boxes labeled "B" or "BFIC") supports a set of four beam forming elements 18 (i.e., 64 beam forming elements supported by 16 BFICs in this example), each CDIC chip 20 (the box labeled "GaAs T/R") aggregates signals to/from a set of BFIC chips 14, and the IFIC chip 24 aggregates signals a number of CDIC chips.

In certain exemplary embodiments, the BFICs 14 are calibrated such as for phase and gain performance. Therefore, in certain exemplary embodiments, the focused calibration techniques described herein can be used for calibration of the specific BFICs in a specific product, e.g., where the BFICs represent the signal processing ICs for which identifying information is sent directly or indirectly to the calibration information generator 104, and with the BFICs being programmed with the calibration information provided by the calibration information generator 104. Additionally or alternatively, calibration information can be obtained for any other programmable signal processing ICs in a particular product, which could include the CDIC(s) and/or the IFIC(s) in certain exemplary embodiments. Thus, for example, using the example shown in FIG. 7, the computation of calibration information can take into account all BFICs 14, CDICs 20, and/or IFICs 24 in an array or subarray for computing phase and gain/attenuation parameters for the various signal processing ICs. For example, calibration information could be computed to distribute system gain across the different signal processing ICs, e.g., so that the amount of gain performed by the IFIC or CDIC chips relative to the BFIC chips result in reduced gain requirements on the BFIC chips (which can lower risk of ripple and oscillation and also can results in reduced overall system power consumption).

It should be noted that the calibration information generator can be configured to generate calibration information not only based on the identification of the specific signal processing ICs but also based on other product information provided directly or indirectly to the calibration information generator, such as, for example, information about the product (e.g., product identifier), the beamforming elements, the CDICs, the IFICs, and/or other information that, in a particular system, could affect the calibration information for the signal processing ICs. Thus, for example, a set of BFICs might warrant different calibration information when installed in different products or when used with different beamforming elements, CDICs, and/or IFICs. An entire chipset could be calibrated as a group, e.g., to optimize the operation of the entire chipset as a whole.

It should be noted that the calibration information generator may return a final set of calibration information to be programmed directly into the product or the controller in the product may generate a final set of calibration information from the calibration information obtained from the calibration information generator. For example, calibration information typically includes gain/attenuation and phase information at different frequency points from production testing from which phase calibration parameters to bring all devices as close to phase synchronization as possible and gain/attenuation parameters to bring all devices as close to gain synchronization as possible (e.g., Atten_N=Gain_N−min (gain_of_all_devices), where Atten_N is the attenuation for signal processing IC N and Gain_N is the nominal gain for signal processing IC N) can be computed for each signal processing IC.

In any of the described embodiments, calibration information can be obtained once (e.g., during initial product configuration) or multiple times (e.g., every time the product is started or restarted). In the latter case, the calibration information might change over time, e.g., due to different interpretation of the performance information or to account for signal processing IC performance changes over time.

Using the techniques described above, array-specific calibration information can be provided for a group of signal processing integrated circuits associated with a product such as a phased array system or 5G device, on-the-fly if desired, using performance information from a database, with no external information regarding performance of any individual signal processing integrated circuit or overall performance of the group of signal processing integrated circuits.

Figure 8:
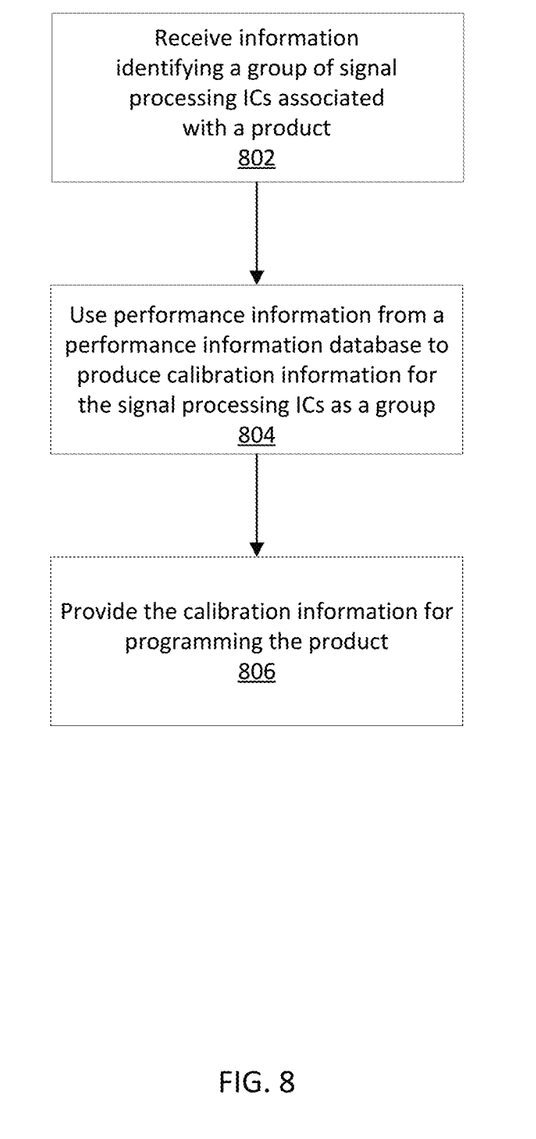
FIG. 8 is a logic flow diagram for a calibration information generator, in accordance with one exemplary embodiment.

FIG. 8 is a logic flow diagram for a calibration information generator, in accordance with one exemplary embodiment. In block 802, the calibration information generator receives information identifying a group of signal processing ICs associated with a product. In block 804, the calibration information generator uses performance information from a performance information database to produce calibration information for the signal processing ICs as a group. In block 806, the calibration information generator provides the calibration information for programming the product.

Figure 9:
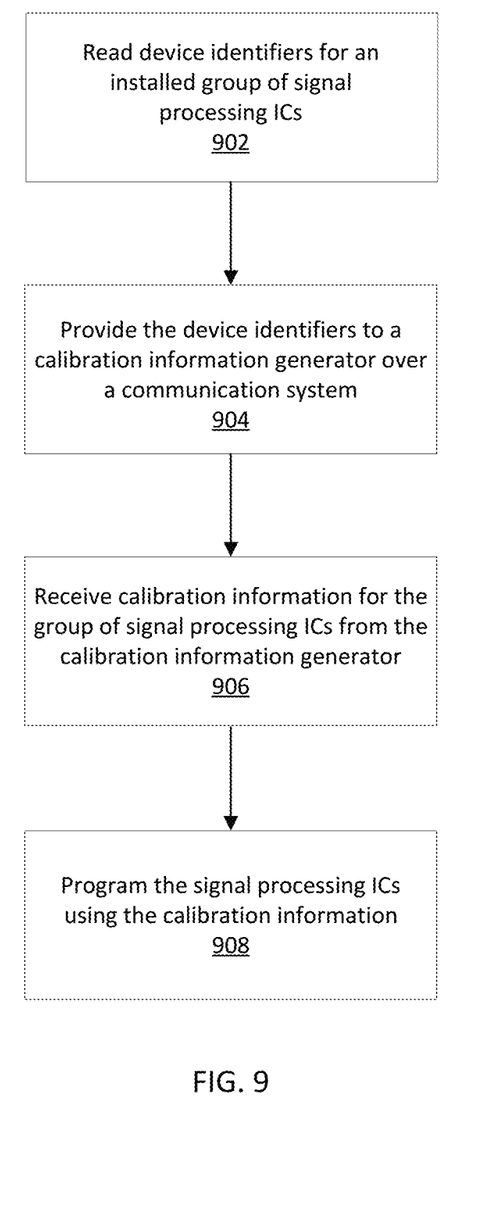
FIG. 9 is a logic flow diagram for a phased array device (product), in accordance with one exemplary embodiment.

FIG. 9 is a logic flow diagram for a phased array device (e.g., product 102), in accordance with one exemplary embodiment. In block 902, the device controller reads device identifiers for an installed group of signal processing ICs. In block 904, the device controller provides the device identifiers to a calibration information generator over a communication system. In block 906, the device controller receives calibration information for the group of signal processing ICs from the calibration information generator. In block 908, the device controller programs the signal processing ICs using the calibration information.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the calibration information generator and overall selective calibration system) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A phased array device comprising:
   a plurality of installed signal processing integrated circuits;
   at least one processor; and
   at least one memory including program code which when executed by the at least one processor provides a controller configured to perform processes comprising at least:
   reading device identifiers for the installed signal processing integrated circuits;
   providing, via a communication system, the device identifiers to a calibration information generator;
   receiving, via the communication system, calibration information from the calibration information generator; and
   configuring, based on the calibration information received from the calibration information generator, the installed signal processing integrated circuits using the calibration information.

2. A phased array device according to claim 1, wherein the calibration information is obtained for the installed signal processing integrated circuits once for an initial configuration of the installed signal processing integrated circuits.

3. A phased array device according to claim 1, wherein the calibration information is obtained for the installed signal processing integrated circuits at multiple times including at least one of:
   each time the product is powered on;
   each time the product restarts;
   each time the product reboots;
   each time the product is reconfigured; or
   each time the product is updated.

4. A phased array device according to claim 1, wherein communication system includes wireless Internet access.

5. A selective calibration system for signal processing integrated circuits, the system comprising:
   a calibration information generator that receives information identifying a group of signal processing integrated circuits associated with a product, the group of signal processing integrated circuits being a subset of a population of signal processing integrated circuits for which performance information is stored, and uses the performance information to produce calibration information for the identified signal processing integrated circuits as a group.

6. A system according to claim 5, wherein the calibration information generator uses only performance information associated with the identified signal processing integrated circuits to produce the calibration information so that each signal processing integrated circuit in the group is calibrated relative to just that group of signal processing integrated circuits.

7. A system according to claim 5, wherein the selective calibration system includes an operator interface through which an operator provides the information identifying the group of signal processing integrated circuits to the calibration information generator and obtains the calibration information for the identified group of signal processing integrated circuits from the calibration information generator.

8. A system according to claim 5, wherein the selective calibration system includes a customer interface through which a customer provides the information identifying the group of signal processing integrated circuits directly to the calibration information generator, which generates the calibration information for the identified group of signal processing integrated circuits and returns the calibration information to the customer via the customer interface for programming the product.

9. A system according to claim 5, wherein the selective calibration system includes a product interface through which the product provides the information identifying the group of signal processing integrated circuits directly to the calibration information generator, which generates the calibration information for the identified group of signal processing integrated circuits and returns the calibration information to the product via the product interface for programming the group of signal processing integrated circuits.

10. A system according to claim 9, wherein product interface includes wireless Internet access.

11. A system according to claim 5, wherein the calibration information is obtained for the product once for an initial product configuration.

12. A system according to claim 9, wherein the calibration information is obtained for the product at multiple times including at least one of:
   each time the product is powered on;
   each time the product restarts;
   each time the product reboots;
   each time the product is reconfigured; or
   each time the product is updated.

13. A system according to claim 5, further comprising:
   a performance information database containing the performance information for the population of signal processing integrated circuits, wherein the calibration information generator uses the performance information from the performance information database to produce the calibration information for the identified signal processing integrated circuits as a group.

14. A selective calibration method comprising:
   receiving, by a calibration information generator, information identifying a group of signal processing integrated circuits associated with a product, the group of signal processing integrated circuits being a subset of a population of signal processing integrated circuits for which performance information is stored; and
   using the stored performance information to produce calibration information for the identified signal processing integrated circuits as a group.

15. A selective calibration method according to claim 14, wherein the calibration information generator uses only performance information associated with the identified signal processing integrated circuits to produce the calibration information so that each signal processing integrated circuit in the group is calibrated relative to just that group of signal processing integrated circuits.

16. A selective calibration method according to claim 14, wherein the information identifying the group of signal processing integrated circuits is received from an operator through an operator interface and wherein the operator obtains the calibration information for the identified group of signal processing integrated circuits from the calibration information generator through the operator interface.

17. A selective calibration method according to claim 14, wherein the information identifying the group of signal processing integrated circuits is received directly from a customer through a customer interface and wherein the customer obtains the calibration information for the identified group of signal processing integrated circuits from the calibration information generator through the customer interface.

18. A selective calibration method according to claim 14, wherein the information identifying the group of signal processing integrated circuits is received directly from the product through a product interface and wherein the calibration information for the identified group of signal processing integrated circuits is returned from the calibration information generator to the product through the product interface.

19. A selective calibration method according to claim 18, wherein product interface includes wireless Internet access.

20. A selective calibration method according to claim 14, wherein the calibration information is obtained for the product once for an initial product configuration.

21. A selective calibration method according to claim 18, wherein the calibration information is obtained for the product at multiple times including at least one of:
   each time the product is powered on;
   each time the product restarts;
   each time the product reboots;
   each time the product is reconfigured; or
   each time the product is updated.

* * * * *